United States Patent
Wang et al.

(10) Patent No.: US 9,800,183 B1
(45) Date of Patent: Oct. 24, 2017

(54) METHOD AND APPARATUS FOR CONTROLLING AN ELECTRIC MACHINE

(71) Applicant: GM GLOBAL TECHNOLOGY OPERATIONS LLC, Detroit, MI (US)

(72) Inventors: Jianglin Wang, Rochester, MI (US); Bon Ho Bae, Torrance, CA (US); Chia-Chou Yeh, Gardena, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/157,955

(22) Filed: May 18, 2016

(51) Int. Cl.
- *H02P 1/04* (2006.01)
- *H02P 27/04* (2016.01)
- *H02P 6/08* (2016.01)
- *H02P 21/22* (2016.01)

(52) U.S. Cl.
CPC ............... *H02P 6/08* (2013.01); *H02P 21/22* (2016.02)

(58) Field of Classification Search
None
See application file for complete search history.

(56) References Cited

U.S. PATENT DOCUMENTS

| | | |
|---|---|---|
| 6,844,701 B2 | 1/2005 | Chen et al. |
| 7,843,162 B2 | 11/2010 | Bae et al. |
| 2007/0290640 A1* | 12/2007 | Williams ............ H02M 7/5387 318/400.42 |
| 2008/0224649 A1* | 9/2008 | Bae ........................ H02P 21/22 318/801 |
| 2008/0224651 A1* | 9/2008 | Schulz ................ H02P 21/0089 318/812 |
| 2009/0179608 A1 | 7/2009 | Welchko et al. |
| 2013/0033206 A1 | 2/2013 | Gallegos-Lopez et al. |
| 2015/0381083 A1 | 12/2015 | Barrass |

OTHER PUBLICATIONS

Asano, Inaguma, Ohtani, Sato, Okamura, Sasaki; "Hign Performance Motor Drive Technologies for Hybrid Vehicles"; 2007 IEEE.
Holtz, Lotzkat, Khambadkone; "On Continuous Control of PWM Inverters in the Overmodulation Range Including the Six-Step Mode"; IEEE vol. 8, No. 4, Oct. 1993.

* cited by examiner

*Primary Examiner* — Bentsu Ro
*Assistant Examiner* — Zemenay Truneh
(74) *Attorney, Agent, or Firm* — Quinn IP Law

(57) ABSTRACT

An inverter electrically operatively connected to an electric machine and in communication with a controller is described. The inverter is electrically connected to a high-voltage DC power bus. A method for controlling the multi-phase inverter circuit includes monitoring, via the controller, a rotational speed of the electric machine during operation of the inverter in an over-modulation mode. The inverter is commanded to operate in a linear modulation mode when the rotational speed is within a speed range associated with objectionable audible noise generated by operating the electric machine in the over-modulation mode.

17 Claims, 2 Drawing Sheets

US 9,800,183 B1

METHOD AND APPARATUS FOR CONTROLLING AN ELECTRIC MACHINE

TECHNICAL FIELD

The present disclosure generally relates to controlling alternating current (AC) motor/generators, and more particularly relates to apparatus, systems and methods for controlling AC motor/generators.

BACKGROUND

Control of AC motor/generators, such as three-phase permanent magnet synchronous electric motors (electric machines) is accomplished using a three-phase pulsewidth-modulated (PWM) inverter. A PWM inverter can be controlled in several different operating modes, including, e.g., a linear modulation mode and an over-modulation mode. One example of a linear modulation mode of operation is a space vector PWM (SVPWM) mode with linear modulation, e.g., up to 90% of a six-step operation, and one example of an over-modulation mode is a full six-step mode.

Magnitude of the output voltage from an inverter at its fundamental synchronous frequency reaches its maximum only when the inverter operates in the over-modulation mode. Due to this voltage magnitude characteristic, operation in the over-modulation mode can increase torque capability of an electric machine in a field-weakening region as compared to operation in a linear modulation mode. This is due to voltage magnitude being a major limiting factor of the torque capability of the electric machine.

SUMMARY

An inverter electrically operatively connected to an electric machine and in communication with a controller is described. The inverter is electrically connected to a high-voltage DC power bus. A method for controlling the multi-phase inverter circuit includes monitoring, via the controller, a rotational speed of the electric machine during operation of the inverter in an over-modulation mode. The inverter is commanded to operate in a linear modulation mode when the rotational speed is within a speed range associated with objectionable audible noise generated by operating the electric machine in the over-modulation mode.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as generally described and illustrated in the Figures herein, could be arranged and designed in a wide variety of different configurations. Thus, the following detailed description of the embodiments of the disclosure is not intended to limit the scope of the disclosure, as claimed, but is merely representative of possible embodiments of the disclosure. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
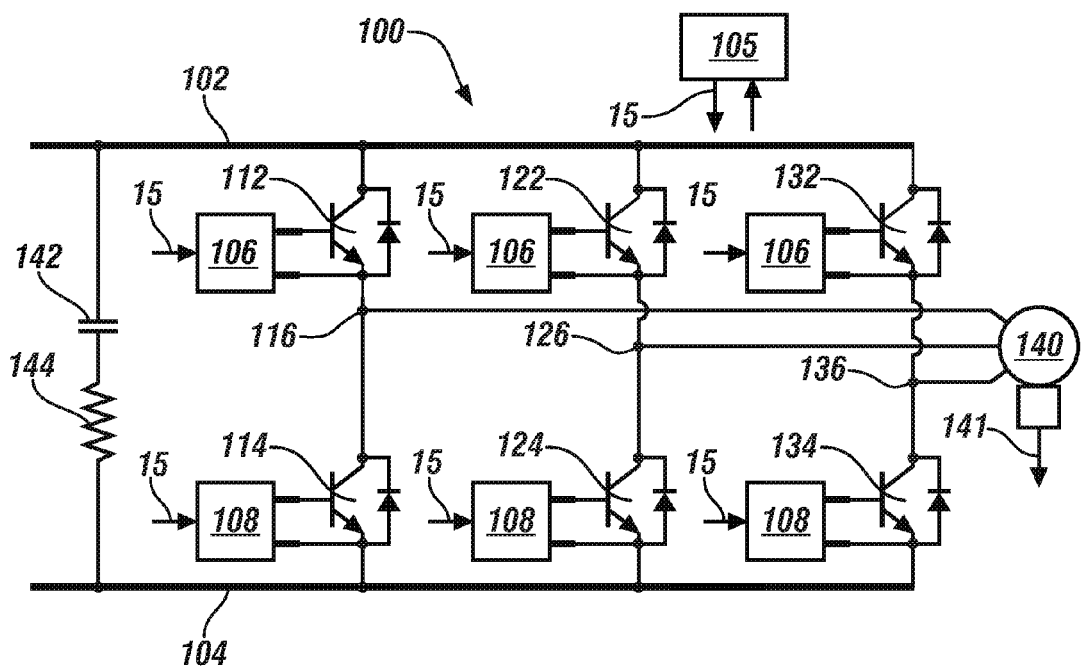
FIG. 1 schematically illustrates a multi-phase PWM inverter circuit that is electrically operatively connected to a multi-phase AC electric motor/generator including an inverter controller, in accordance with the disclosure.

Referring now to the drawings, wherein the depictions are for the purpose of illustrating certain exemplary embodiments only and not for the purpose of limiting the same, FIG. 1 schematically illustrates a multi-phase PWM inverter circuit (inverter) 100 that is electrically operatively connected to a multi-phase AC electric motor/generator (electric machine) 140 and in communication with a Voltage Source Inverter (VSI) controller 105, in accordance with the disclosure. The electric machine 140 and associated inverter 100 may be advantageously employed to provide vehicle propulsion power. The vehicle may be an electric vehicle, a fuel-electric hybrid vehicle, or another vehicle configuration that employs electric power stored on an on-board energy storage system for vehicle propulsion. The vehicle may include, by way of non-limiting examples, a passenger vehicle, a light-duty or heavy-duty truck, a utility vehicle, an agricultural vehicle, an industrial/warehouse vehicle, or a recreational off-road vehicle. The vehicle may include a passenger compartment that includes a seating arrangement for one or multiple passengers.

The electric machine 140 is preferably a permanent magnet synchronous device including a stator and a rotor arranged in a star configuration, although the concepts described herein are not so limited. Alternatively, the electric machine 140 may be configured as an induction machine, a switched reluctance machine, or another suitable electric machine. The electric machine 140 includes windings that are arranged on the stator to generate a rotating magnetic field that acts upon the rotor to induce torque. The rotating magnetic field is generated by the inverter 100. Rotational position and speed of the rotor of the electric machine 140 is monitored by a rotational position sensor 141, which may be any suitable device, e.g., a resolver or a Hall-effect sensor.

The inverter 100 electrically connects to a high-voltage DC power source via a positive high-voltage DC power bus (HV+) 102 and a negative high-voltage DC power bus (HV−) 104. The high-voltage DC power source may include a high-voltage electrical energy storage device, e.g., a high-voltage battery or a capacitor, a high-voltage electric power generator or another related device or system. The inverter 100 includes a plurality of switch pairs 112 and 114, 122 and 124, and 132 and 134 electrically connecting in series between HV+ 102 and HV− 104. Each of the switch pairs corresponds to a phase of the electric machine 140, with each of the first switches connecting in series with the corresponding second switch at a node. Specifically, switch pairs 112 and 114 connect in series at node 116 to form a first arm of the inverter 100, switch pairs 122 and 124 connect in series at node 126 to form a second arm of the inverter 100 and switch pairs 132 and 134 connect in series at node 136 to form a third arm of the inverter 100. The nodes 116, 126 and 136 electrically connect to nominal first, second and third phases of the electric machine 140 to transfer electric power thereto. A first gate drive circuit 106 controls activation and deactivation of the first, high-side switches 112, 122 and 132 and a second gate drive circuit 108 controls activation and deactivation of the second, low-side switches 114, 124 and 134. The first and second gate drive circuits 106, 108 include any suitable electronic device capable of activating and deactivating the switches 112 and 114, 122 and 124, and 132 and 134 to effect power transfer between one of HV+ 102 and HV− 104 and a phase of the electric machine 140 in response to control signals originating at controller 105. The controller 105 generates control signals that are communicated via signal lines 15 to the first and second gate drive circuits 106, 108 to activate and deactivate the switches 112 and 114, 122 and 124, and 132 and 134 in response to an inverter switch control mode that can include a linear-modulation PWM mode, e.g., up to 90% of a six-step operation, and an over-modulation mode, e.g., a full six-step mode, or another suitable control mode. The inverter 100 includes other electrical components including capacitors, e.g., DC bus capacitor 142, resistors, e.g., bus resistor 144 and other electrical circuit components to accomplish functions related to electrical noise suppression, load balancing and the like.

Each of the first switches 112, 122 and 132 and second switches 114, 124 and 134 can be controlled to either an ON state or an OFF state. Each of the arms formed by the switch pairs 112 and 114, 122 and 124, and 132 and 134 can be controlled to a control state of 1 or 0. A control state of 1 for one of the arms corresponds to activation of one of the first switches 112, 122 and 132 with a corresponding second switch 114, 124 or 134, respectively, deactivated. A control state of 0 for one of the arms corresponds to activation of one of the second switches 114, 124 and 134 with corresponding first switch 112, 122 or 132, respectively, deactivated.

Each of the first switches 112, 122 and 132 is preferably configured as a normally-OFF switch, meaning that the switch conducts electrical current only when activated by the first gate drive 106. In one embodiment, the first switches 112, 122 and 132 are Insulated Gate Bipolar Transistors (IGBTs) each having a diode arranged in parallel. The first gate drive 106 activates each of the first switches 112, 122 and 132 to effect current flow thereacross responsive to the selected inverter switch control mode. Each of the second switches 114, 124 and 134 is preferably configured as a normally-OFF switch, meaning that the switch conducts electrical current only when activated by the second gate drive 108. The second switches 114, 124 and 134 may be any kind of normally-OFF semiconductor switch, including, e.g., IGBT switches each having a diode arranged in parallel. During operation in absence of a circuit fault, the first and second gate drive circuits 106, 108 generate activation signals to activate and deactivate the first switches 112, 122 and 132 and the second switches 114, 124 and 134 to operate the electric machine 140 to generate torque. Alternatively, the first switches 112, 122 and 132 and the second switches 114, 124 and 134 may be any suitable semiconductor switch. The inverter 100 electrically operatively connects to the electric machine 140, and the action of selectively activating and deactivating switches 112 and 114, 122 and 124, and 132 and 134 induces an electric field in an element of a stator of the electric machine 140 to generate magnetic force that acts on an element of the rotor to urge movement of the rotor towards or away from the stator, thus inducing torque in a shaft member mechanically coupled to the rotor. As such, control signals originating at controller 105 effect power transfer between one of HV+ 102 and HV− 104 and a phase of the multi-phase electric machine 140.

The controller 105 monitors signal inputs from sensors, e.g., the rotational position sensor 141, and selectively controls operation of the inverter 100 in one of a linear modulation mode and an over-modulation mode in response to a torque or speed command, which may be communicated from another controller. The controller 105 controls torque output from the electric machine 140 through the inverter 100, which electrically connects to a high-voltage DC electric power supply via HV+ 102 and HV− 104. Control methods for switching among inverter states to regulate torque output of the electric machine 140 include operating in either a linear modulation mode or an over-modulation mode, e.g., a six-step mode. In the linear modulation mode, the inverter 100 rapidly controls the switch pairs to switch among two of the non-zero states and the zero state multiple times during each cycle of the rotor of the electric machine 140 to produce an AC voltage and current in each winding of the stator. The controller 105 specifies what fraction of the time is spent in each of the three states by specifying PWM duty cycles. The controller 105 updates the PWM duty cycles at regular intervals such that the frequency of updates is significantly higher than the frequency of the rotor rotation. In the over-modulation mode, the inverter 100 cycles through each of the six non-zero states once per cycle of the rotor of the electric machine 140 to produce an AC voltage and current in each winding of the stator. A rotor cycle is defined relative to motor poles and does not necessarily correspond to a complete revolution of the rotor. As such, when operating in the linear modulation mode, the magnitude of the control signal is less than or equal to the magnitude of the carrier signal, and when operating in the over-modulation mode, the magnitude of the control signal is greater than the magnitude of the carrier signal.

The controller 105 includes a current regulator and a flux controller for controlling operation of inverter 100 to control operation of the electric machine 140 in either the linear modulation mode or the over-modulation mode. The amplitude of the AC voltage is dictated by the magnitude of the DC voltage level on the high-voltage DC bus that electrically connects a high-voltage electric power source to the inverter 100. The torque is dictated by the DC voltage level, the rotor speed, and the phase difference between these quasi-sinusoidal AC voltage signals and the rotor position, and may further be controlled by operating in the over-modulation mode. The controller 105 issues commands to the inverter 100 indicating when to switch to the next state in the sequence. The over-modulation mode is an operating mode of the inverter 100 that includes cycling the inverter 100 through the six non-zero states once per cycle of the rotor of the electric machine 140 to produce an AC voltage and current in each winding of the stator. A rotor cycle is defined relative to motor poles and does not correspond to a complete revolution of the rotor when a multi-pole electric machine is employed. By way of example, in a permanent magnet electric machine, the fundamental synchronous frequency can be determined as follows:

$$\omega e = \omega rm * PP \quad [1]$$

wherein:
ωe is the fundamental synchronous frequency;
ωrm is the mechanical motor speed or frequency; and
PP is the quantity of pole pairs of the electric machine.

Similarly, when an induction motor electric machine is employed, the fundamental synchronous frequency can be determined as follows:

$$\omega e = \omega rm * PP + \omega sl \quad [2]$$

wherein
ωe is the fundamental synchronous frequency;
ωrm is the mechanical motor speed or frequency;
PP is the quantity of pole pairs of the electric machine; and
ωsl is the slip frequency.

The fundamental synchronous frequency ωe is physically equivalent to rotating frequency of the rotor flux, and is also referred to as a synchronous frequency. Additional details related to operation are described with reference to FIG. 2.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link, and is indicated by the signal lines 15. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time.

Figure 2:
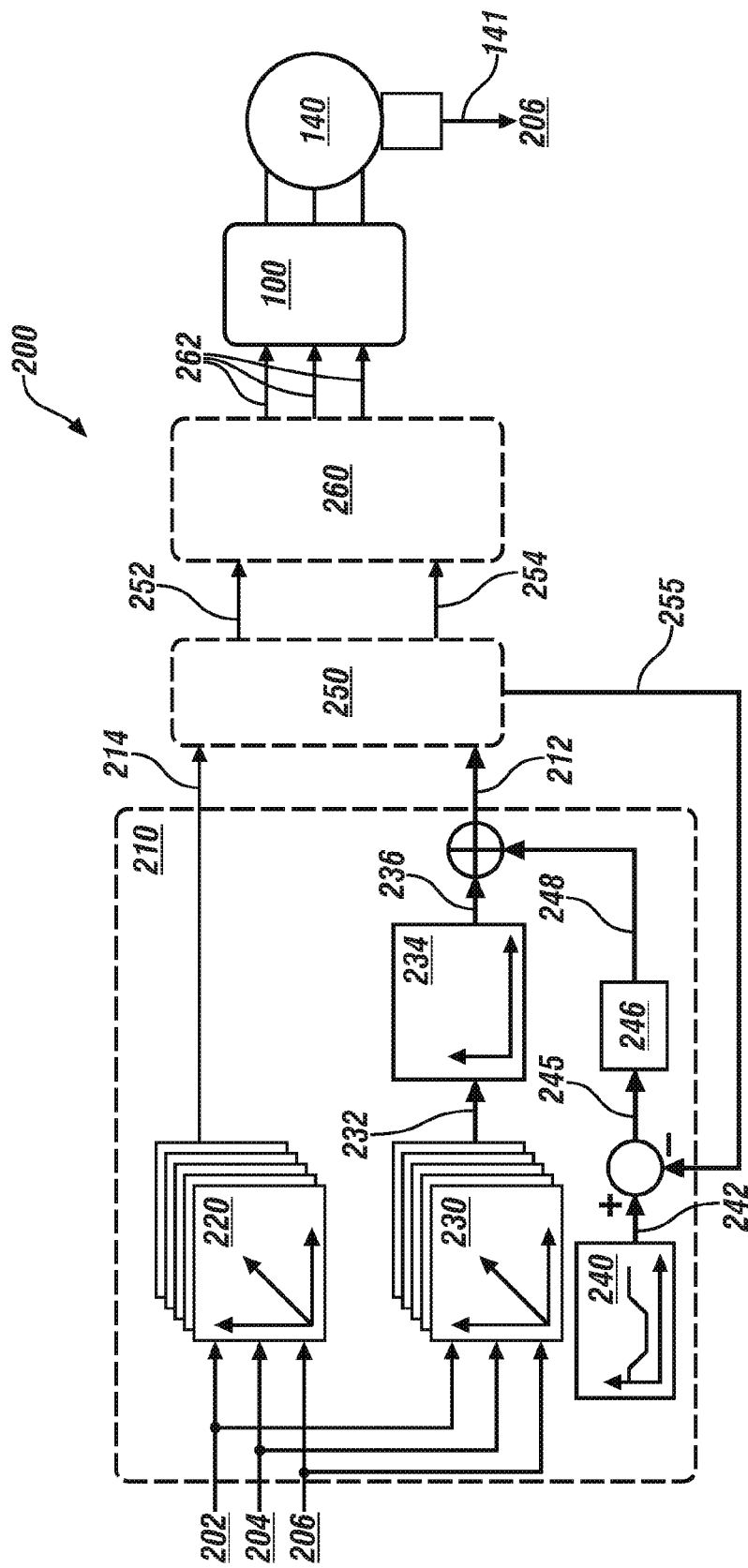
FIG. 2 schematically shows a control architecture for controlling an embodiment of the multi-phase PWM inverter circuit described with reference to FIG. 1, in accordance with the disclosure.

FIG. 2 schematically shows a control architecture 200 for controlling an embodiment of the inverter 100 and electric machine 140 that are described with reference to FIG. 1. The control architecture 200 may be implemented as hardware, software, and/or firmware components, and provides a method for controlling the inverter 100 to avoid operation in the over-modulation mode when the rotational speed of the electric machine 140 is within a speed range associated with objectionable audible noise generated by operation in the over-modulation mode. Instead, the inverter is commanded to operate in a linear modulation mode when the rotational speed of the electric machine 140 is within the speed range associated with objectionable audible noise generated by operation in the over-modulation mode.

The control architecture 200 includes a current determination routine 210, a current control routine 250, and an inverter control routine 260, all of which combine to generate inverter commands to control the inverter 100 in either the linear modulation mode or the over-modulation mode. The current determination routine 210 and the current control routine 250 are calculated and described in context of a d-q synchronous reference frame having direct and quadrature axes, also referred to as d-q axes. The inverter control routine 260 transforms the d-q synchronous reference frame values to synchronous reference frame values, also referred to as a-b-c values. Synchronous reference frame analyses are known to those skilled in the art, and thus not described in detail herein.

Overall, a torque command 202, a voltage level 204 of the high-voltage DC power source, and motor speed 206 are provided as inputs to the current determination routine 210, which determines direct and quadrature current commands Id* 212 and Iq* 214, respectively. The current control routine 250 employs the direct and quadrature current commands Id* 212 and Iq* 214 to determine direct and quadrature voltage commands Vd* 252 and Vq* 254 and a modulation index squared $M^2$ 255 that is provided as a feedback term. The inverter control routine 260 employs the direct and quadrature voltage commands Vd* 252 and Vq* 254 to generate inverter commands $D_A$, $D_B$ and $D_C$ 262 to control the inverter 100 in either the linear modulation mode or the over-modulation mode, which controls operation of the electric machine 140.

The torque command 202, the voltage level 204 of the high-voltage DC power source, the motor speed 206 and the modulation index squared $M^2$ 255 are provided as inputs to the current determination routine 210.

A quadrature reference table 220 is employed to determine a magnitude of the quadrature current command Iq* 214 based upon the torque command 202, the voltage level 204 of the high-voltage DC power source and the motor speed 206. The quadrature reference table 220 is specific to the electric machine 140, and is preferably determined off-line by characterization of the electric machine 140 over operating ranges of speeds and torques. The quadrature reference table 220 may be reduced to practice as an array of numeric values that are stored in a non-volatile memory device that can be interrogated by the controller 105.

A flux reference table 230 is employed to determine a magnitude of a flux command λ.* 232 based upon the torque command 202, the voltage level 204 of the high-voltage DC power source and the motor speed 206. The flux reference table 230 is specific to the electric machine 140, and is preferably determined off-line by characterization of the electric machine 140 over operating ranges of speeds and torques. The flux reference table 230 may be reduced to practice as an array of numeric values that are stored in a non-volatile memory device that can be interrogated by the controller 105. The flux command λ* 232 is employed to determine an initial direct current command $I_{di}$* 236, which is arithmetically combined with a direct current feedback command $I_{d\_FB}$* 248 to determine the direct current command $I_d$* 212.

Figure 3:
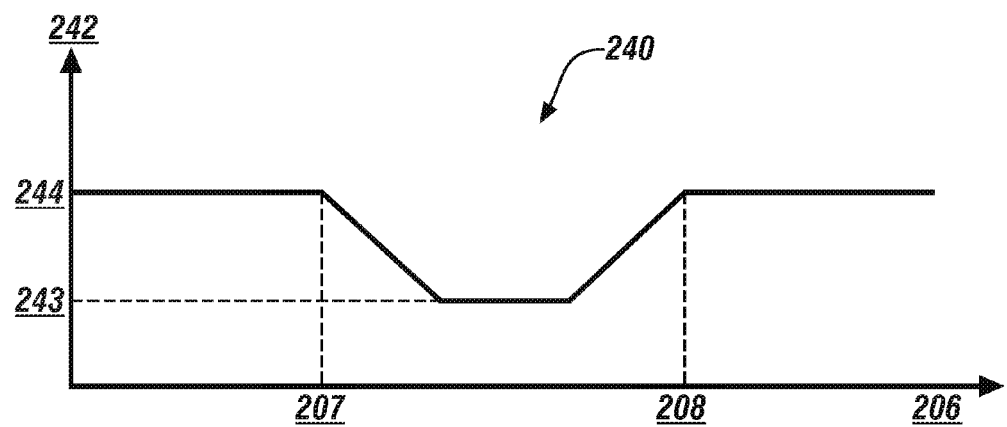
FIG. 3 graphically shows a modulation index calibration table that may be employed to determine a value for an initial modulation index in relation to rotational speed of an embodiment of the multi-phase AC electric motor/generator described with reference to FIG. 1, in accordance with the disclosure.

The motor speed 206 is employed to determine an initial modulation index squared $M^2$ 242, which is a command to operate the inverter 100 employing either linear modulation or over-modulation. FIG. 3 graphically shows a modulation index calibration table 240 that may be employed to determine a value for the initial modulation index squared $M^2$ 242 in relation to the rotational speed 206. As shown the initial modulation index squared $M^2$ 242 is indicated on the vertical axis in relation to the rotational speed 206 on the horizontal axis. The rotational speed 206 on the horizontal axis includes a speed range defined by a first speed level $n_1$ 207 and a second speed level $n_2$ 208. The initial modulation index squared $M^2$ 242 may be either an index associated with a linear modulation mode 243 or an index associated with an over-modulation mode 244, depending upon the rotational speed 206. When the rotational speed 206 falls outside of the speed range, i.e., is less than the first speed level $n_1$ 207 or greater than the second speed level $n_2$ 208, the initial modulation index squared $M^2$ 242 is associated with the over-modulation mode 244. When the rotational speed 206 falls with the speed range, i.e., is between the first speed level $n_1$ 207 and the second speed level $n_2$ 208, the initial modulation index squared $M^2$ 242 is associated with the linear modulation mode 243. The modulation index calibration table 240 may be implemented in a control routine as a one-dimensional array of values that are stored in a non-volatile memory device that may be accessed and interrogated by the current determination routine 210.

Operation in the over-modulation mode improves voltage utilization, but may also increase the harmonics in motor current and battery current. This harmonic current can generate noise and vibration in the electric motor and battery. The magnitude of noise and vibration varies depending on the motor speed because the operating conditions of the motor, e.g. power, current and flux level, change in relation to the motor speed. As such, the modulation index squared $M^2$ 255 is characterized in relation to motor speed in order to control acoustic noise level generated by the electric machine 140 at each speed.

When the electric machine 140 operates in the over-modulation mode, a harmonic frequency may be generated that results in audible acoustic sound within a certain speed range that may be objectionable to passengers in the passenger compartment. Audible acoustic sound that is objectionable may be defined by a sound frequency spectrum and associated noise level that may be measured in decibels (dB). By way of example, the audible sound experienced by a vehicle passenger may be objectionable, i.e., exceed a maximum acceptable noise level (in dB), when the electric machine 140 is operating in the over-modulation mode 244, i.e., less than the first speed level $n_1$ 207 or greater than the second speed level $n_2$ 208. The objectionable audible sound experienced by a vehicle passenger may be a sixth-order harmonic frequency that is caused by operation in the over-modulation mode 244 and associated with operation in the full six-step mode. In contrast, the audible sound experienced by a vehicle passenger may be acceptable, i.e., be less than the maximum acceptable noise level (in dB), when the electric machine 140 is operating in the linear modulation mode 243 between the first speed level $n_1$ 207 and the second speed level $n_2$ 208.

As such, the initial modulation index squared $M^2$ 242 is selected to command operation of the electric machine 140 in the linear modulation mode 243 between the first speed level $n_1$ 207 and the second speed level $n_2$ 208 to preclude operation in the over-modulation mode. The first speed level $n_1$ 207 and the second speed level $n_2$ 208 are specific to the electric machine 140 and its application, and thus may be empirically determined during development. Furthermore, the magnitudes of the first speed level $n_1$ 207 and the second speed level $n_2$ 208 may differ, depending upon whether the inverter 100 is controlling the electric machine 140 to operate as an electric motor to produce torque in response to a positive torque command or operate as an electric generator to produce electric power in response to a negative or reactive torque command.

Operating in the over-modulation mode facilitates maximizing the voltage output capability of the inverter 100, employing field-weakening to reduce back-emf. When the electric machine 140 is operating at a speed that is less than a base speed that is associated with achieving a maximum power output, the voltage is below the system limit and increases with speed. At the base speed, the voltage is equal to the maximum allowable voltage level. When the motor speed is greater than the base speed, flux is reduced inversely with respect to speed using a process referred to as field-weakening. Field-weakening, which may be implemented as one or more routines and calibrations, modifies the flux by reducing the initial direct current command $I_{di}$* 236 in order to maintain the terminal voltage. When operating the electric machine 140 at a maximum allowable high-voltage DC power source voltage, the current draw is less, and thus the electric machine 140 operates at higher efficiency. As such, power capability of the system may be maximized. Operating the electric machine 140 at voltage levels associated with the maximum allowable high-voltage DC power source voltage requires operating in the over-modulation mode.

The modulation index squared $M^2$ 255 is a feedback term that may be defined as a normalized fundamental reference voltage, and is determined as a ratio of a peak fundamental phase voltage and a maximum available voltage, and has a range between 0.0 and 1.0. The modulation index squared $M^2$ 255 may be determined as follows:

$$m_i = V_{fund} \bigg/ \frac{2}{\pi} V_{DC}$$

wherein:
$m_i$ is the square root of the modulation index squared $M^2$ 255;
$V_{fund}$ is a peak fundamental phase voltage of electric power supplied to the electric machine 140, calculated as follows:

$$V_{fund} = \sqrt{(Vd^{*2} + Vq^{*2})}$$

employing the direct and quadrature voltage commands Vd* 252 and Vq* 254; and $V_{DC}$ is a maximum available bus voltage from the high-voltage DC power source as measured or otherwise determined between HV+ 102 and HV− 104.

The modulation index squared $M^2$ 255 is arithmetically subtracted from the initial modulation index squared M 242 to determine a difference term 245, which is input to a proportional-integral controller 246 to determine the direct current feedback command $I_{d\_FB}$* 248. The initial direct current command $I_{di}$* 236 is arithmetically combined with the direct current feedback command $I_{d\_FB}$* 248 to determine the direct current command $I_d$* 212.

The current control routine 250 employs the direct and quadrature current commands Id* 212 and Iq* 214 to determine direct and quadrature voltage commands Vd* 252 and Vq* 254. The inverter control routine 260 employs the direct and quadrature voltage commands Vd* 252 and Vq* 254 to generate inverter commands $D_A$, $D_B$ and $D_C$ 262 to control the inverter 100 in either the linear modulation mode or the over-modulation mode, which controls operation of the electric machine 140. In this manner, the inverter 100 can operate in the over-modulation mode to increase rotational speed of the electric machine 140 in a flux-weakening region while managing noise generation.

Those having ordinary skill in the art will recognize that the teachings may be described herein in terms of functional and/or logical block components and/or various processing steps. It should be realized that such block components may be composed of any number of hardware, software, and/or firmware components configured to perform the specified functions. Furthermore, the phrase "operatively connected" indicates that there is a connection between two or more elements, in the form of an electrical, mechanical, pneumatic, or another connection, which permits one of the elements to control operation of another of the elements to perform a designated task.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling an inverter electrically operatively connected to an electric machine and in communication with a controller, wherein the inverter is electrically connected to a high-voltage DC power bus, the method comprising:
   monitoring, via the controller, a rotational speed of the electric machine while operating the inverter in an over-modulation mode;
   commanding operation of the inverter in a linear modulation mode when the rotational speed is within a speed range associated with objectionable audible noise generated by operating the electric machine in the over-modulation mode;
   monitoring, via the controller, a torque command and a voltage level of the high-voltage DC power bus;
   determining a commanded quadrature current based upon the torque command, the rotational speed of the electric machine, and the voltage level of the high-voltage DC power bus;
   determining an initial direct current based upon the torque command, the rotational speed of the electric machine, and the voltage level of the high-voltage DC power bus;
   determining an initial modulation index based upon the rotational speed of the electric machine;
   determining a modulation index;
   determining a feedback current command based upon the initial modulation index and the modulation index;
   determining a final commanded direct current based upon the initial direct current and the feedback current command; and
   determining operating commands for controlling the inverter based upon the commanded quadrature current and the final commanded direct current.

2. The method of claim 1, wherein the modulation index is determined based upon a peak fundamental phase voltage level of electric power supplied to the inverter and a maximum available bus voltage level from the high-voltage DC power bus.

3. The method of claim 1, wherein determining the initial modulation index based upon the rotational speed of the electric machine comprises selecting a magnitude for the initial modulation index that is associated with controlling the inverter in the linear modulation mode when the rotational speed falls within the speed range associated with objectionable audible noise generated by operating the electric machine in the over-modulation mode, wherein the speed range is defined by a first speed level and a second speed level.

4. The method of claim 1, wherein determining the initial modulation index based upon the rotational speed of the electric machine comprises selecting a magnitude for the initial modulation index that is associated with an over-modulation mode for controlling the inverter when the rotational speed falls outside a speed range defined by a first speed level and a second speed level.

5. The method of claim 1, wherein determining the operating commands for controlling the inverter based upon the commanded quadrature current and the final commanded direct current comprises employing final commanded direct current and the commanded quadrature current to generate inverter commands to control the inverter in the linear modulation mode.

6. The method of claim 1, wherein determining the operating commands for controlling the inverter based upon the commanded quadrature current and the final commanded direct current comprises employing the final commanded direct current and the commanded quadrature current to generate inverter commands to control the inverter in the over-modulation mode.

7. The method of claim 1, wherein the objectionable audible noise generated by operating the electric machine in the over-modulation mode is defined by a sound frequency spectrum and an associated noise level measured in decibels.

8. The method of claim 1, wherein operating the inverter in the over-modulation mode comprises controlling switch pairs of the inverter to cycle through each of six non-zero states once per cycle of the rotor of the electric machine; and
   wherein commanding operation of the inverter in the linear modulation mode comprises commanding the inverter to control each of the switch pairs of the inverter to switch among two of the non-zero states and the zero state multiple times during each cycle of the rotor of the electric machine.

9. An apparatus, comprising:
an inverter circuit electrically operatively connected to an electric machine;
a high-voltage DC power source electrically connected to the inverter circuit;
a controller in communication with the inverter and the electric machine, the controller including an instruction set, the instruction set executable to:
command the inverter to operate in an over-modulation mode and monitor a rotational speed of the electric machine during such operation; and
command the inverter to operate in a linear modulation mode when the rotational speed is within a speed range associated with objectionable audible noise generated by operating the electric machine in the over-modulation mode;
monitor a torque command and a voltage level associated with the high-voltage DC power source;
determine a commanded quadrature current based upon the torque command, the rotational speed of the electric machine, and the voltage level;
determine an initial direct current based upon the torque command, the rotational speed of the electric machine, and the voltage level;
determine an initial modulation index based upon the rotational speed of the electric machine;
determine a modulation index;
determine a feedback current command based upon the initial modulation index and the modulation index;
determine a final commanded direct current based upon the initial direct current and the feedback current command; and
determine operating commands for controlling the inverter based upon the commanded quadrature current and the final commanded direct current.

10. The method of claim 9, comprising the instruction set executable to determine the modulation index based upon a peak fundamental phase voltage level of electric power supplied to the inverter and a maximum available bus voltage level from the high-voltage DC power bus.

11. The method of claim 9, wherein the instruction set executable to determine the initial modulation index based upon the rotational speed of the electric machine comprises the instruction set executable to select a magnitude for the initial modulation index that is associated with controlling the inverter in the linear modulation mode when the rotational speed falls within the speed range associated with objectionable audible noise generated by operating the electric machine in the over-modulation mode, wherein the speed range is defined by a first speed level and a second speed level.

12. The method of claim 9, wherein the instruction set executable to determine the initial modulation index based upon the rotational speed of the electric machine comprises the instruction set executable to select a magnitude for the initial modulation index that is associated with an over-modulation mode for controlling the inverter when the rotational speed falls outside a speed range defined by a first speed level and a second speed level.

13. The method of claim 9, wherein the instruction set executable to determine the operating commands for controlling the inverter based upon the commanded quadrature current and the final commanded direct current comprises the instruction set executable to employ the final commanded direct current and the commanded quadrature current to generate inverter commands to control the inverter in the linear modulation mode.

14. The method of claim 9, wherein the instruction set executable to determine the operating commands for controlling the inverter based upon the commanded quadrature current and the final commanded direct current comprises the instruction set executable to employ the final commanded direct current and the commanded quadrature current to generate inverter commands to control the inverter in the over-modulation mode.

15. The method of claim 9, wherein the objectionable audible noise generated by operating the electric machine in the over-modulation mode is defined by a sound frequency spectrum and an associated noise level measured in decibels.

16. The apparatus of claim 9, wherein the inverter comprises a multi-phase inverter circuit including a plurality of switch pairs, wherein each of the switch pairs corresponds to a phase of the electric machine.

17. The apparatus of claim 9, wherein the instruction set executable to command operation of the inverter in the over-modulation mode comprises the instruction set executable to control switch pairs of the inverter to cycle through each of six non-zero states once per cycle of a rotor of the electric machine; and
wherein the instruction set executable to command operation of the inverter in the linear modulation mode comprises the instruction set executable to command the inverter to control each of the switch pairs of the inverter to switch among two of the non-zero states and a zero state multiple times during each cycle of the rotor of the electric machine.

* * * * *